(12) United States Patent
Hamamura et al.

(10) Patent No.: US 7,098,939 B2
(45) Date of Patent: Aug. 29, 2006

(54) IMAGE DISPLAY DEVICE AND METHOD FOR DISPLAYING THUMBNAIL BASED ON THREE-DIMENSIONAL IMAGE DATA

(75) Inventors: Hiroyasu Hamamura, Higashihiroshima (JP); Yoshio Umeda, Higashihiroshima (JP); Tamaki Nakamura, Higashihiroshima (JP); Tadashi Uchiumi, Urayasu (JP); Toshio Nomura, Hachioji (JP); Norio Ito, Chiba (JP)

(73) Assignee: Sharp Kabushiki Kaisha, Kyoto (JP)

( * ) Notice: Subject to any disclaimer, the term of this patent is extended or adjusted under 35 U.S.C. 154(b) by 89 days.

(21) Appl. No.: 10/663,742

(22) Filed: Sep. 17, 2003

(65) Prior Publication Data

US 2004/0056981 A1   Mar. 25, 2004

(30) Foreign Application Priority Data

Sep. 25, 2002  (JP) .............................. 2002-279817

(51) Int. Cl.
*H04N 13/04* (2006.01)
*G09G 5/00* (2006.01)

(52) U.S. Cl. ..................... 348/51; 345/633; 715/838
(58) Field of Classification Search .................. 348/51, 348/42, 52; 345/633, 665, 670; 715/838
See application file for complete search history.

(56) References Cited

U.S. PATENT DOCUMENTS 6,507,358 B1 *   1/2003   Mori et al. ..................... 348/42
6,868,192 B1 *   3/2005   Takiguchi ..................... 382/299

FOREIGN PATENT DOCUMENTS

| EP | 1 153 638 A1 | 11/2001 |
| JP | 5-122733 | 5/1993 |
| JP | 7-236164 | 9/1995 |
| JP | 9-330022 | 12/1997 |

OTHER PUBLICATIONS

"IEEE 100 the Authoritative Dictionary of IEEE Standards", 7th edition, Dec. 2000, Institute of Electrical and Electronics Engineers, pp. 104, 306.*
European Search Report mailed Jul. 13, 2004 in corresponding EP application No. 03021055.3-1241.
Patent Abstracts of Japan, vol. 1999, No. 03, Mar. 31, 1999 & JP 10 336705 A (Canon Inc), Dec. 18, 1998.
Patent Abstracts of Japan, vol. 2000, No. 26, Jul. 1, 2002 & JP 2001 251403 A (Sony Corp), Sep. 14, 2001.

* cited by examiner

*Primary Examiner*—Kee M. Tung
*Assistant Examiner*—Michelle K. Lay
(74) *Attorney, Agent, or Firm*—Nixon & Vanderhye, PC

(57) ABSTRACT

A retention memory retains 2D image data picked-up and output by camera portion in association with corresponding thumbnail image data. The 2D image data retained in the retention memory is converted to 3D image data formed of image data for left-eye and for right-eye for stereoscopic vision of the image as desired. A retention portion creates thumbnail image data with a shrunken image based on this 3D image data and stores the created thumbnail image data and the 3D image data in the retention memory in association with each other. The thumbnail image data is created, for example, by reducing the left-eye image data and the right-eye image data of the 3D image data to satisfy a thumbnail size. A listing of thumbnails based on the thumbnail image data in retention memory is displayed on a display portion so that the retained image can be recognized at a glance.

22 Claims, 11 Drawing Sheets

IMAGE DISPLAY DEVICE AND METHOD FOR DISPLAYING THUMBNAIL BASED ON THREE-DIMENSIONAL IMAGE DATA

BACKGROUND OF THE INVENTION

1. Field of the Invention

The present invention relates to an image display device and method, and more particularly to an image display device and method for displaying an image based on data in a three-dimensional image format.

2. Description of the Background Art

Conventionally, a three-dimensional image (referred to as a 3D image hereinafter) is displayed using a liquid crystal display integrally formed of a display liquid crystal panel and a slit liquid crystal panel, for example, as disclosed in Japanese Patent-Laying Open No. 5-122733.

Japanese Patent Laying-Open No. 7-236164, for example, discloses a device that displays a 3D image and a two-dimensional image (referred to as a 2D image hereinafter) simultaneously on the same screen.

Japanese Patent Laying-Open No. 9-330022 discloses the following image display device. Three-dimensional image information is attached to map data read from a memory in accordance with a predetermined rule so that display data is created through three-dimensional computer graphics processing. The created image data is then used to display a three-dimensional image on a two-dimensional screen.

Recently, as image data in a variety of formats, including 2D images and 3D images are handled simultaneously, a device having an image display stores image data in these different kinds of formats in a mixed manner. When the listing of the stored image data in different kinds of formats is displayed in the form of a menu, the listing of so-called thumbnails where the image is shrunken for display is convenient, rather than displaying the file name of the file.

Conventionally, however, no device has been proposed to display a thumbnail image based on data in accordance with a 3D image format.

SUMMARY OF THE INVENTION

An object of the present invention is to provide an image display device and method that allows a shrunken image for a target image to be displayed based on data in accordance with a 3D image format.

In order to achieve the aforementioned object, an image display device in accordance with an aspect of the present invention includes: a display portion; a three-dimensional shrunken image creating portion for creating a shrunken image formed by shrinking a target image, based on data of a three-dimensional image formed of a left-eye image and a right-eye image for stereoscopic vision of the target image; and a shrunken image displaying portion for displaying the created shrunken image on the display portion.

The three-dimensional shrunken image creating portion has a reducing portion for reducing data of the left-eye image and the right-eye image of the three-dimensional image data so that the target image satisfies the size of the shrunken image.

Therefore, it is possible to create and display a shrunken image by reducing data of the left-eye image and the right-eye image of the three-dimensional image data of the target image, even if the target image is based on data in accordance with the three-dimensional image format.

In the image display device described above, an image is preferably viewed as a two-dimensional image on the display portion.

Therefore, it is possible to display a shrunken image on the display portion for displaying an image in such a manner that it is viewed as a two-dimensional image, even if the target image is based on data in accordance with the three-dimensional image format.

Preferably, the reducing portion has a size-cut portion for cutting that portion of data which exceeds the size of the shrunken image of the target image, from the data of the left-eye image and the right-eye image.

Therefore, it is possible to create a shrunken image easily since the data of the left-eye image and the right-eye image is reduced to satisfy the size of the shrunken image by cutting that portion of data which exceeds the size of the shrunken image of the target image.

In the image display device described above, the data of the left-eye image and the right-eye image is preferably bitmap data. Where the bitmap data is divided into a plurality of matrix data, the reducing portion extracts a representative value in each matrix and forms data of the left-eye image and the right-eye image with a plurality of the extracted representative values.

Therefore, the data of the left-eye image and the right-eye image corresponding to the shrunken image is formed of the representative values in respective matrixes of data of the left-eye and right-eye images of the original target image. As a result, the created shrunken image is reproduced from the original target image with high fidelity, though it is shrunken.

Preferably, the image display device described above further includes a two-dimensional shrunken image creating portion for creating the shrunken image formed by shrinking the target image, based on two-dimensional image data for the target image.

Therefore, it is possible to create and display a shrunken image even if the target image is based on data in accordance with the two-dimensional image format.

Preferably, the three-dimensional image data is one of externally applied data and data created based on the two-dimensional image data for the target image.

Therefore, it is possible to obtain the three-dimensional image data for the target image from a source external to the device or by creating the same inside the device based on the two-dimensional image data for the target image. As a result, the three-dimensional image data for the target image can be obtained in a variety of ways.

The shrunken image displaying portion described above preferably displays information indicative of whether the shrunken image is data created based on the three-dimensional image data.

Therefore, it can be known whether the shrunken image appearing on the display portion is formed of three-dimensional image data or not, that is, whether it is formed of three-dimensional image data or two-dimensional image data.

The two-dimensional image data described above is preferably image data obtained by picking up and outputting an image of an object. Therefore, it is possible to obtain data of a three-dimensional image of an object and display a shrunken image thereof from the two-dimensional image obtained by picking up and outputting an image of an object.

The image display device described above further includes a data storing portion for storing data of a plurality of the created shrunken images in association with respective image data that is a source for creating the shrunken image data. The shrunken image displaying portion displays a listing of a plurality of the shrunken images on the display portion, based on the data of a plurality of the shrunken images stored in the data storing portion.

Therefore, once the created shrunken image data is stored in the data storing portion in association with the original image data thereof, a plurality of shrunken images based on a plurality of stored shrunken image data are listed on the display portion.

Therefore, it is possible to recognize a plurality of target images based on corresponding image data by viewing the displayed listing of shrunken images.

The image display device described above may be installed on mobile equipment. Such mobile equipment may be a mobile phone.

An image display method in accordance with another aspect of the present invention includes: a three-dimensional shrunken image creating step of creating a shrunken image formed by shrinking a target image, based on data of a three-dimensional image formed of a left-eye image and a right-eye image for stereoscopic vision of the target image; and a shrunken image displaying step of displaying the created shrunken image. The three-dimensional shrunken image creating step has a reducing step of reducing data of the left-eye image and the right-eye image of the three-dimensional image data so that the target image satisfies the size of the shrunken image.

Therefore, it is possible to create and display a shrunken image by reducing data of the left-eye image and the right-eye image of the three-dimensional image data for the target image, even if the target image is based on data in accordance with the three-dimensional image format.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

In the following, an embodiment of the present invention will be described with reference to the figures.

Figure 1:
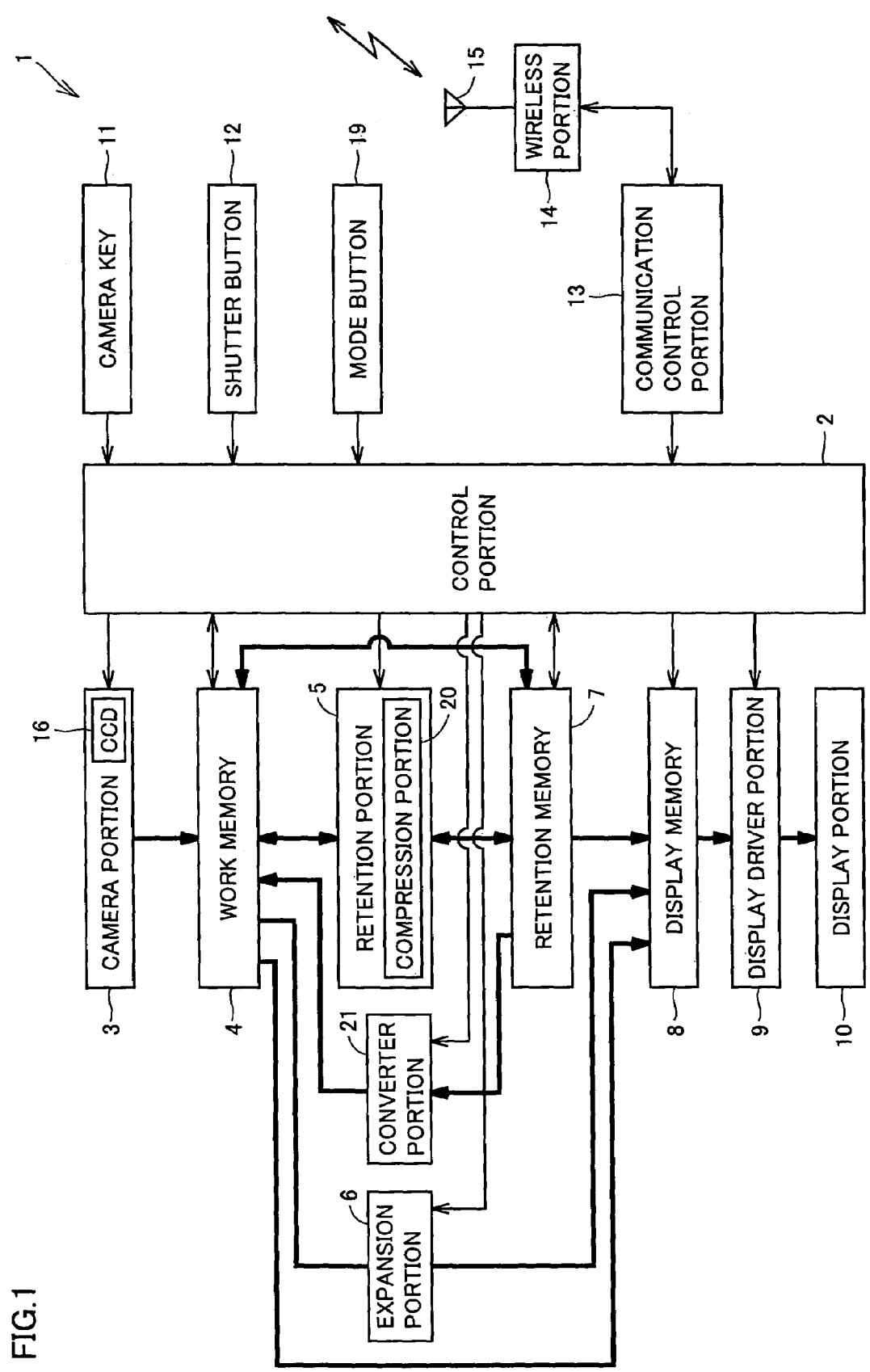
FIG. 1 is a block diagram showing a configuration of a camera-mounted mobile phone in accordance with an embodiment of the present invention.
Figure 2:
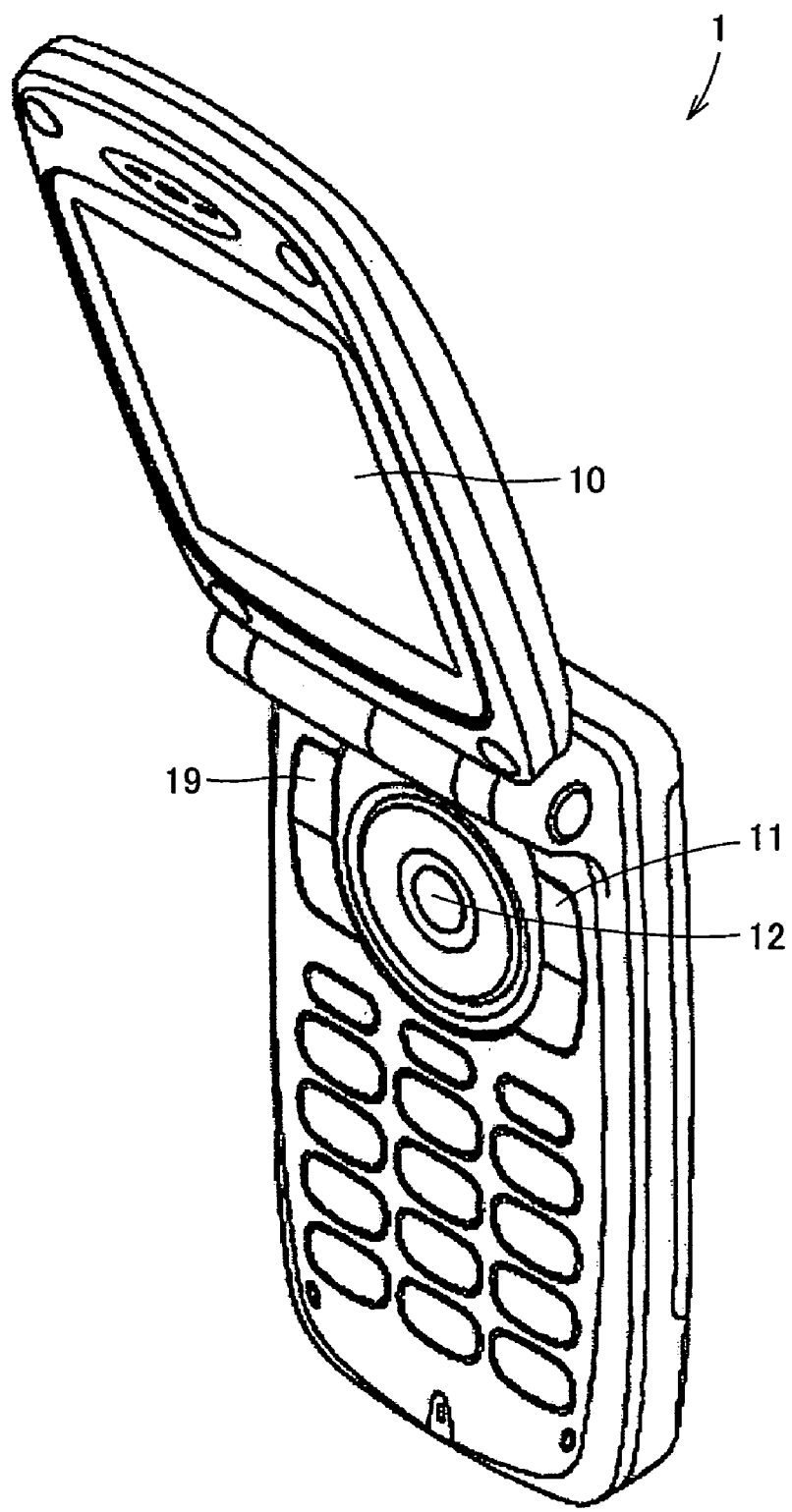
FIG. 2 is an external view of the camera-mounted mobile phone in FIG. 1.
Figure 3:
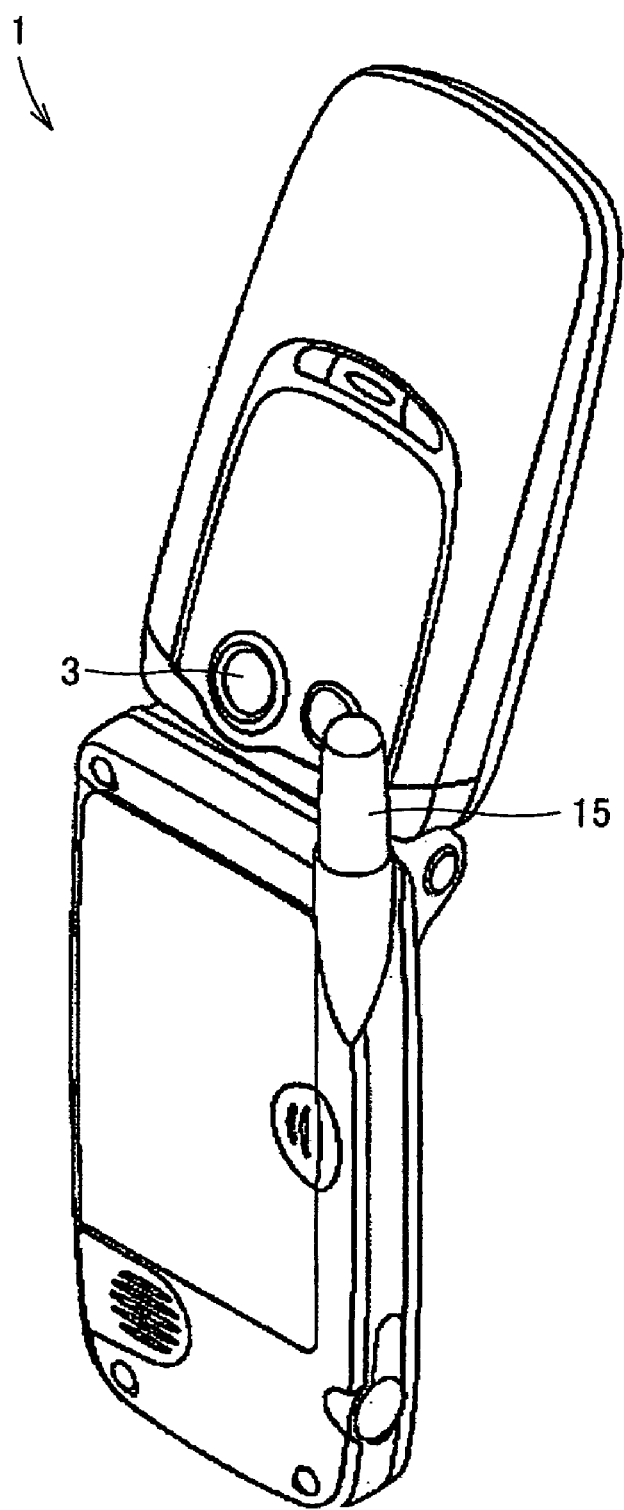
FIG. 3 is an external view of the camera-mounted mobile phone in FIG. 1.

FIG. 1 shows a block configuration of a camera-mounted mobile phone (abbreviated as a mobile phone hereinafter) 1 in accordance with an embodiment of the present invention. FIGS. 2 and 3 show external views of mobile phone 1. Referring to FIGS. 2 and 3, mobile phone 1 includes a camera portion 3 for picking up an image of an object for outputting image data, a display portion 10 formed of liquid crystal or the like, a camera key 11 operated to activate camera portion 3, a shutter button 12 operated to allow camera portion 3 to perform a shutter operation, and to retain image data as picked-up and obtained, an antenna 15 for communication, and a mode button 19. The kind and arrangement of buttons or keys for a variety of operations are not limited thereto. For example, an operation menu appearing on display portion 10 may provide selection of items to be operated.

Referring to FIG. 1, mobile phone 1 includes a control portion 2 formed of a micro-processor such as a CPU (Central Processing Unit) for controlling each portion, a camera portion 3 including a CCD (Charge Coupled Device) 16, a work memory 4 formed of a RAM (Random Access Memory), a retention portion 5 having a compression portion 20 for encoding (compressing) image data for retention, an expansion portion 6 for expanding (decoding) image-related data into an image, a retention memory 7 formed of a flash memory, a display memory 8 formed of a RAM, a display driver portion 9, a display portion 10, a camera key 11, a shutter button 12, and a mode button 19, a communication control portion 13 and a wireless portion 14 for communication through an antenna 15, and a converter portion 21 for conversion between a 2D image format and a 3D image format. In FIG. 1, a bold line indicates a flow of image data.

Display portion 10 employs a liquid crystal device for a slit, as shown in Japanese Patent Laying-Open No. 5-122733, for example. When the slit liquid crystal device is turned on, image data in the 3D image format displayed on display portion 10 can provide a stereoscopic vision of the image. Display portion 10 switches between a 2D mode where the slit liquid crystal device is turned off for 2D image display and a 3D mode where the slit liquid crystal device is turned on for 3D image display. This mode switching is performed through an operation of mode button 19. Control portion 2 performs the switching between 2D mode and 3D mode of display portion 10 in accordance with the operation of mode button 19.

Figure 4:
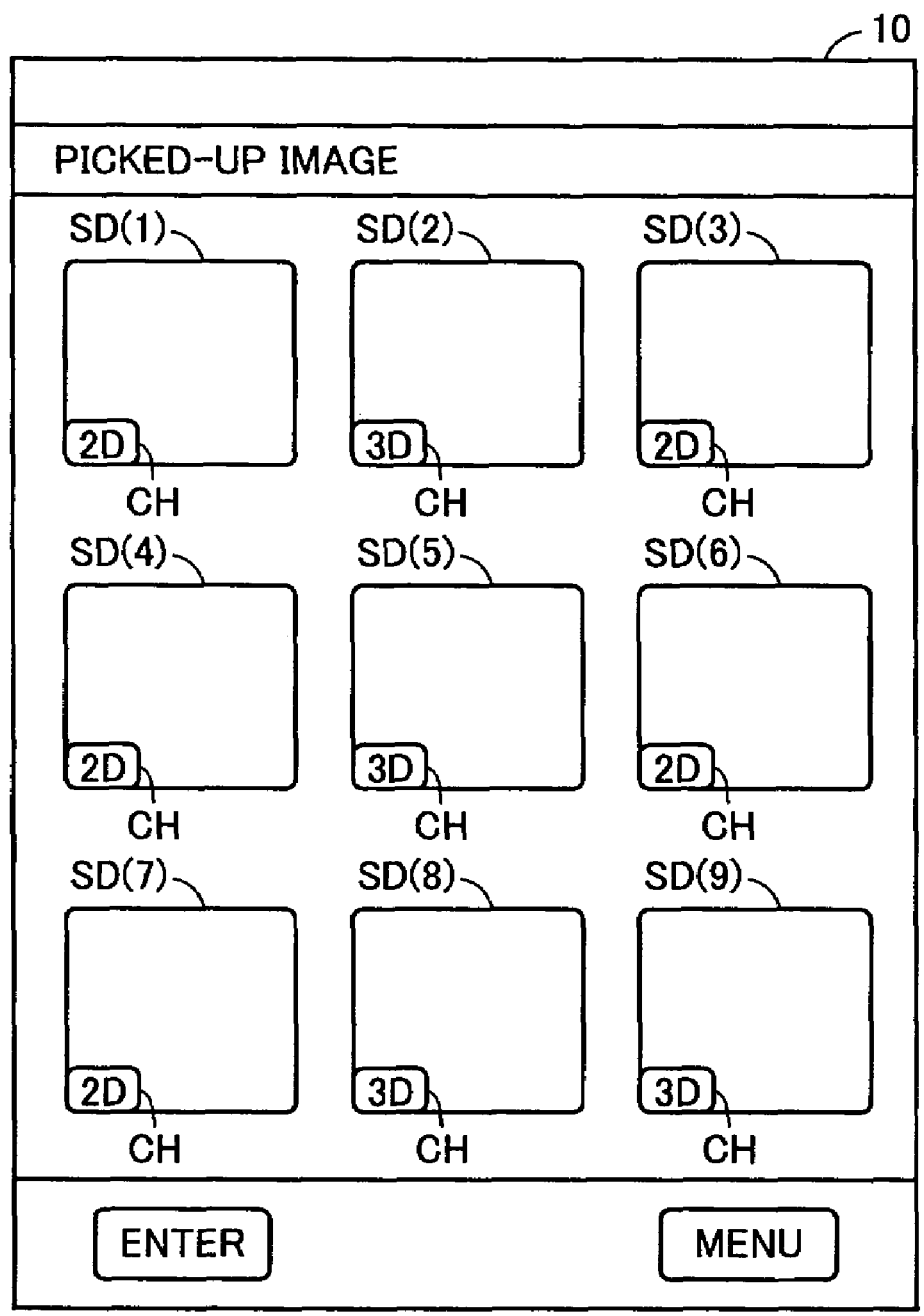
FIG. 4 shows an exemplary displayed listing of thumbnail images in accordance with the embodiment.

In the present embodiment, a variety of image data such as image data picked-up and output by camera portion 3 can be stored and retained in retention memory 7. When the listing of image data retained in retention memory 7 is displayed, the images based on the image data are listed on display portion in the form of shrunken images, that is, so-called thumbnails, as shown in FIG. 4. The procedure for displaying the thumbnails shown in FIG. 4 will be explained in greater detail below with reference to FIGS. 9–11. When the image data in retention memory 7 is listed in the form of thumbnails on display portion 10, the thumbnail images are displayed in the order of thumbnail positions SD(1)–SD(9) in a screen. When there are more than nine thumbnails, the remaining thumbnails can be listed, as shown in FIG. 4, by requesting the next screen.

FIGS. 5A and 5B, FIG. 6, FIGS. 7A–7D, and FIG. 8 show a series of procedures for retaining image data in such a manner that thumbnails can be displayed. FIGS. 9A and 9B, and FIGS. 10A and 10B show exemplary data structures for retaining images in work memory 4 and retention memory 7.

Figure 9A:
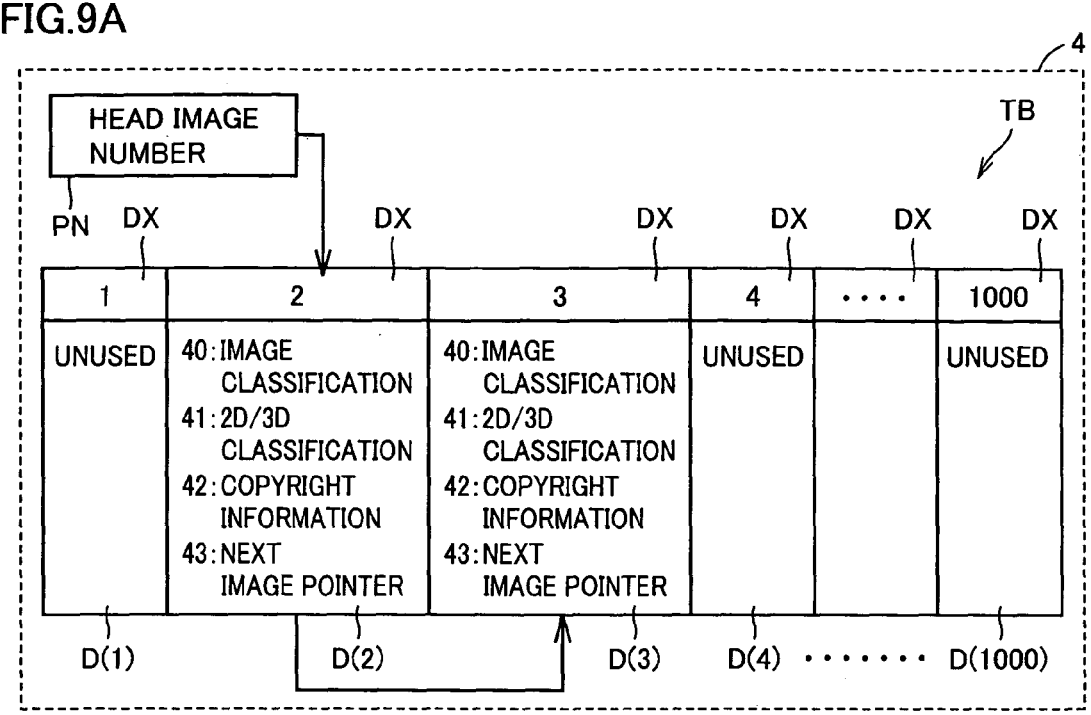
FIGS. 9A and 9B illustrate an exemplary data structure for retaining images in a work memory and a retention memory.
Figure 9B:
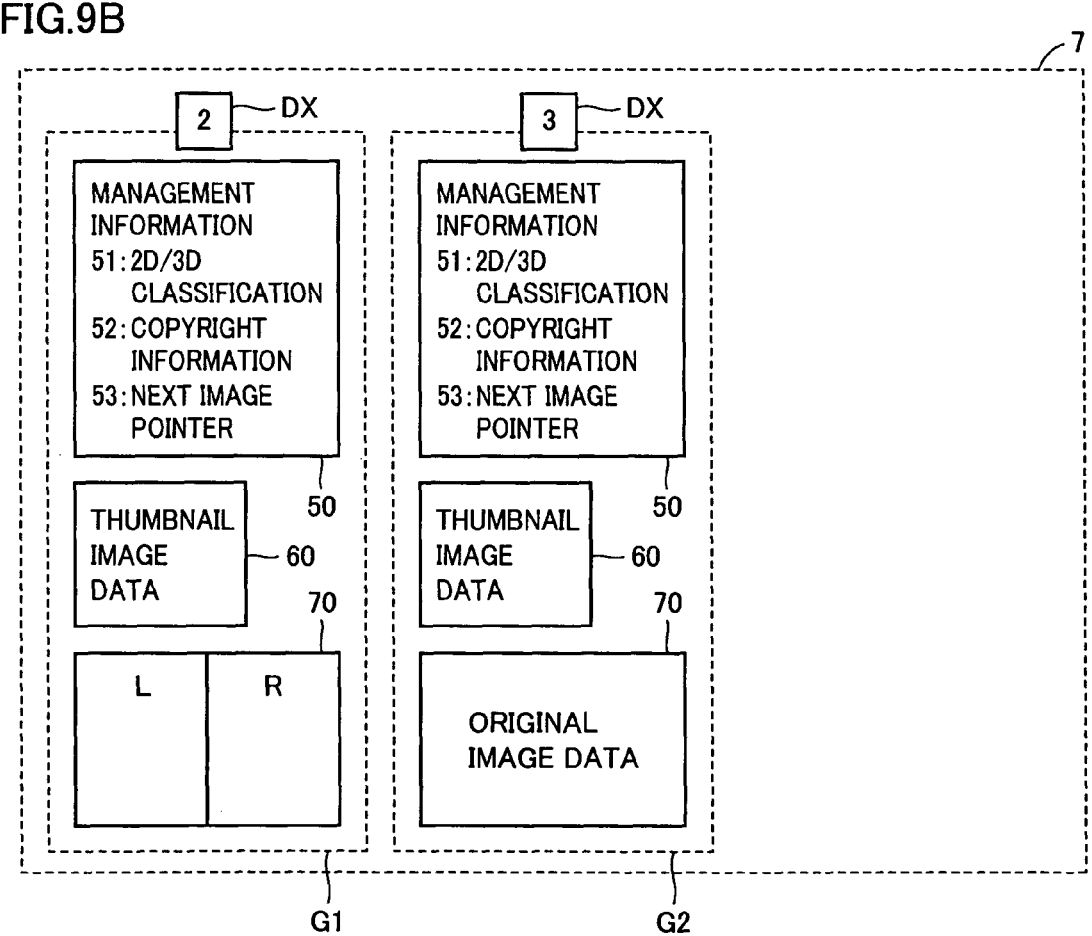

Referring to FIGS. 9A and 9B, the data structures for retaining images in work memory 4 and retention memory 7 will be described. Retention memory 7 stores (retains) a data group Gi (i=1, 2, 3, . . . , n) in a retention order for respective image data that is retained and listed in the form of thumbnails. In FIG. 9B, it is assumed that data groups G1 and G2 are stored by way of illustration. Data group Gi has image number data DX for uniquely identifying a corresponding retained image, management information 50, thumbnail image data 60, and original data 70 that is a source for creating a thumbnail image, such that they are associated with each other. Management information 50 includes 2D/3D classification data 51 indicating whether corresponding original image data 70 is in accordance with 2D image format or 3D image format, copyright information 52 for corresponding image data, and a next image pointer 53 that is pointer information designating a data group G (i+1) of an image stored on the next level (having the next retention order). Therefore, data groups Gi can be accessed continuously in the retention order by following next image pointer 53.

In FIG. 9B, original image data 70 in data group G1 is formed of image data for left eye (left-eye image data) L and image data for right eye (right-eye image data) R to allow three-dimensional display in accordance with 3D image format, and original image data 70 in data group G2 is formed of a single unit of image data in accordance with 2D image format.

Retention memory 7 described above is formed of a flash memory, which requires relatively much time to search the content. Work memory 4 superior in a search speed is thus utilized to realize a quick search. As shown in FIG. 9A, work memory 4 stores a management information table TB for intensively managing management information 50 stored in retention memory 7. Management information table TB has, for example, 1000 pieces of reference information D(j) (j=1, 2, 3, . . . , 1000) corresponding to a maximum number of data groups Gi that can be stored in retention memory 7.

Reference information D(j) includes image number data DX, image classification data 40, 2D/3D classification data 41, copyright information 42, and a next image pointer 43. Reference information D(j) indicates a content based on management information 50 of data group Gi when data group Gi indicated by image number data DX is stored using an area of retention memory 7. On the other hand, it indicates "unused" when the area is not used (where no data group is stored). Image classification data 40 indicates a compression format for original image data 70 and thumbnail image data 60 of a corresponding data group Gi. Data 41–43 other than image classification data 40 is similar to data 51–53 previously mentioned, and description thereof will not be repeated.

In work memory 4 in FIG. 9A, reference information D(j) corresponding to data group Gi at the head, that is, the latest one in the retention order (the last stored one) is indicated by a pointer PN.

In order to refer to (read) the content of data group Gi from retention memory 7, pointer PN is first used to search for the head reference information D(j). Image number data DX indicated by the found reference information D(j) is then specified, and based on the specified image number data DX, the content (management information 50, thumbnail image data 60, and original image data 70) of data group Gi at the head, that is, the last stored data group can be read from retention memory 7.

The procedure of retaining data of a target image such as an object image to be displayed in a thumbnail-displayable manner will be described with reference to the flowcharts in FIGS. 5A and 5B. Here, it is assumed that image data in 2D image format is obtained as 2D image data picked up and output by camera portion 3, and image data in 3D image format is obtained by reading original image data 70 in 2D image format retained in retention memory 7 and converting by converter portion 21 in accordance with a prescribed procedure.

Figure 5A:
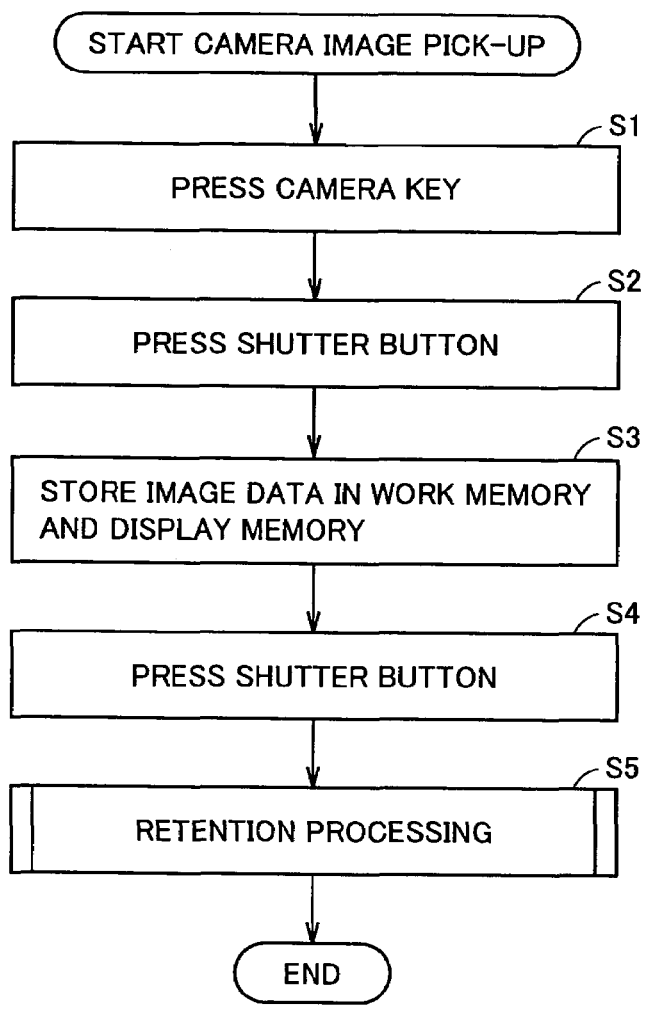
FIGS. 5A and 5B are flowcharts illustrating a procedure of retaining image data in such a manner that a thumbnail can be displayed in accordance with the embodiment.
Figure 5B:
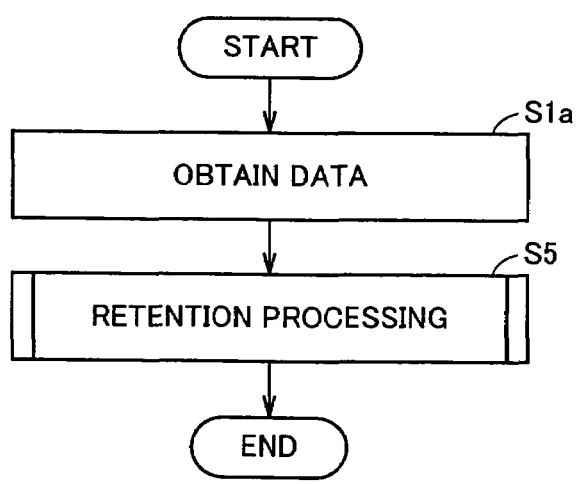

FIG. 5A shows a procedure of obtaining 2D image data. When camera key 11 is pressed, camera portion 3 is activated (step (abbreviated as "S" hereinafter) 1). When camera portion 3 picks up an image of an object, image data in 2D image format based on the taken-in object image is stored in display memory 8 through work memory 4. Then, display driver portion 9 displays the object image in 2D image format on display portion 10 based on the image data read from display memory 8. Here, it is assumed that display portion 10 is in 2D display mode through the switching operation of mode button 19.

When the user recognizing the displayed image wishes to retain the image and presses shutter button 12 (S2), the image data in 2D image format of the object that is picked up and output by camera portion 3 when shutter button 12 is pressed (referred to as "picked-up image data" hereinafter) is written into and temporarily stored in work memory 4 and is also stored in display memory 8 by control portion 2 (S3). The image based on the picked-up image data stored in display memory 8 is displayed on display portion 10 through display driver portion 9. When the user recognizing the displayed picked-up image presses shutter button 12 again (S4), retention portion 5 performs picked-up image data retention processing in such a manner that a thumbnail can be displayed (S5).

Figure 6:
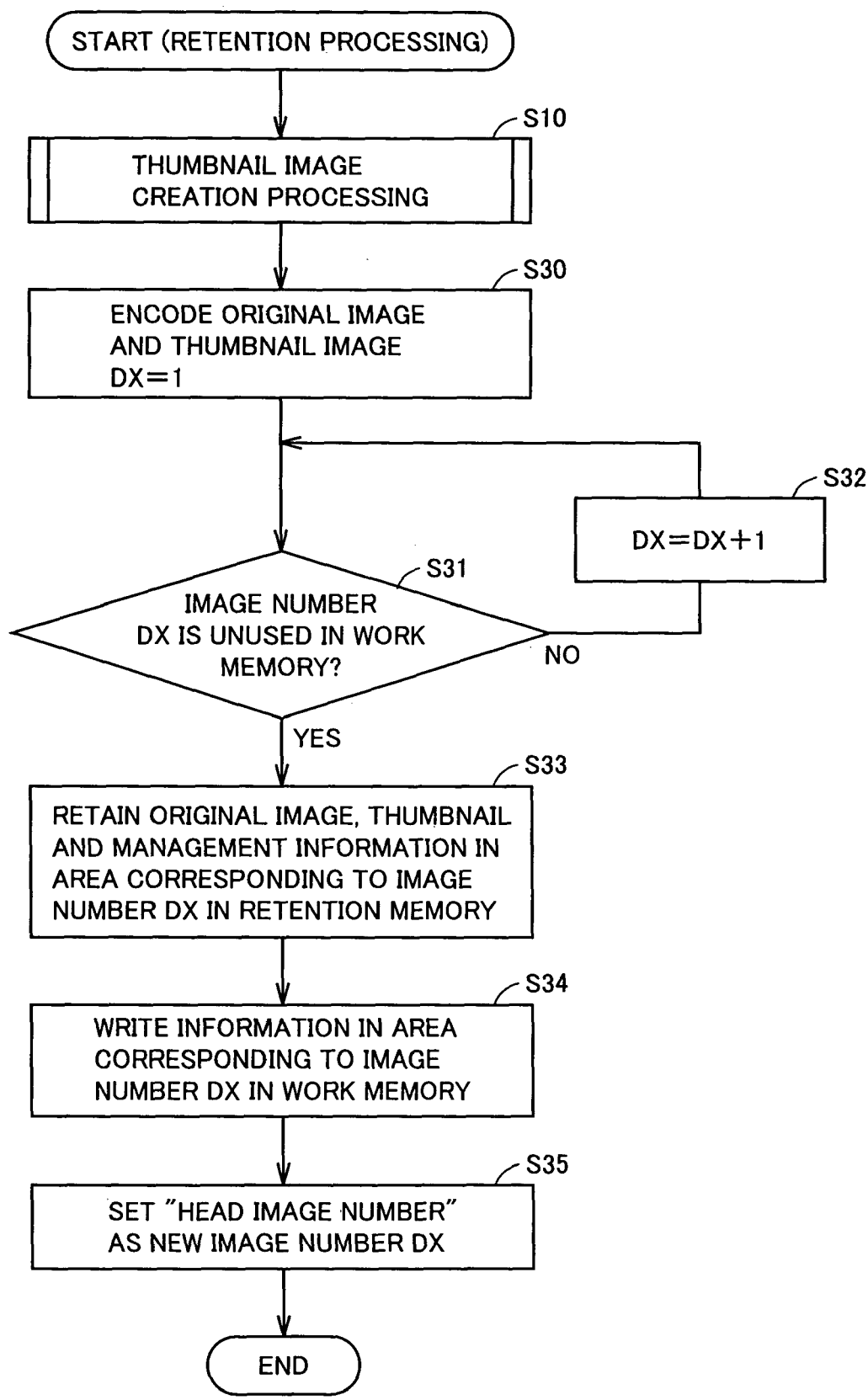
FIG. 6 is a flowchart illustrating a procedure of retention processing in FIGS. 5A and 5B.

FIG. 6 shows the procedure of the retention processing. Retention portion 5 creates thumbnail image data 60 in work memory 4 from the image data temporarily stored in work memory 4 (S10).

Figure 7A:
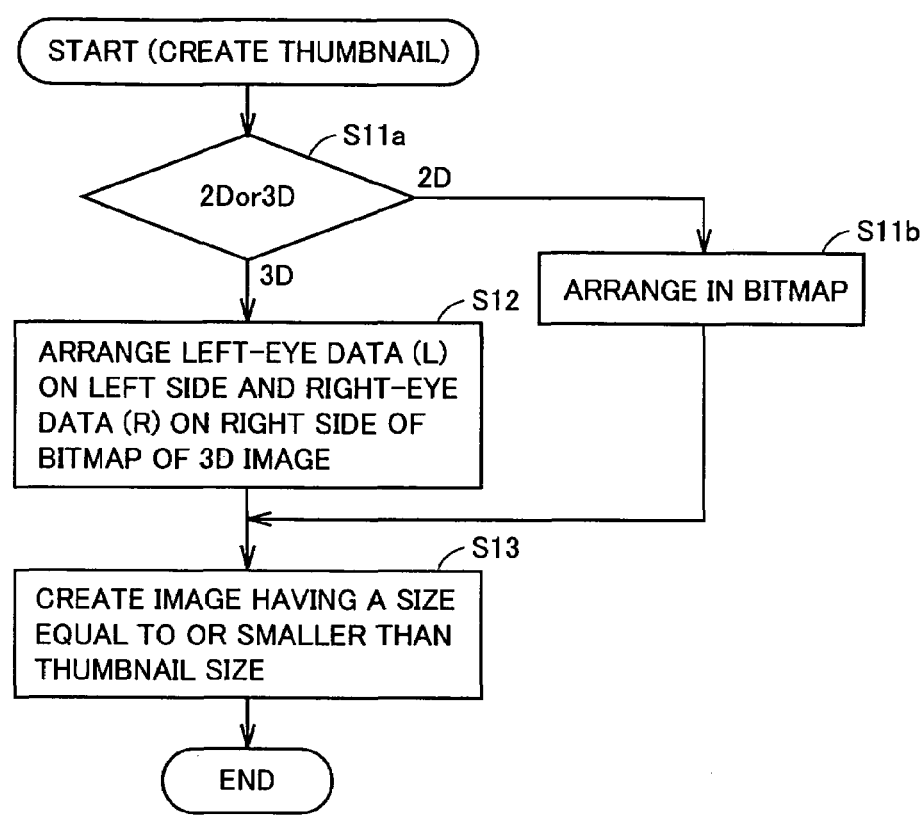
FIGS. 7A–7D illustrate a procedure of creating a thumbnail image.

The flowchart in FIG. 7A shows the procedure of the thumbnail image creation processing (S10). Since it is determined based on the picked-up image data that the data is in accordance with 2D image format ("2D" at S11a), the picked-up image data is arranged in the bitmap of 2D image in work memory 4 (S11b). Thereafter, an image having a size equal to or smaller than that of a thumbnail, that is, a thumbnail image is created based on the picked-up image data (S13).

Figure 8:
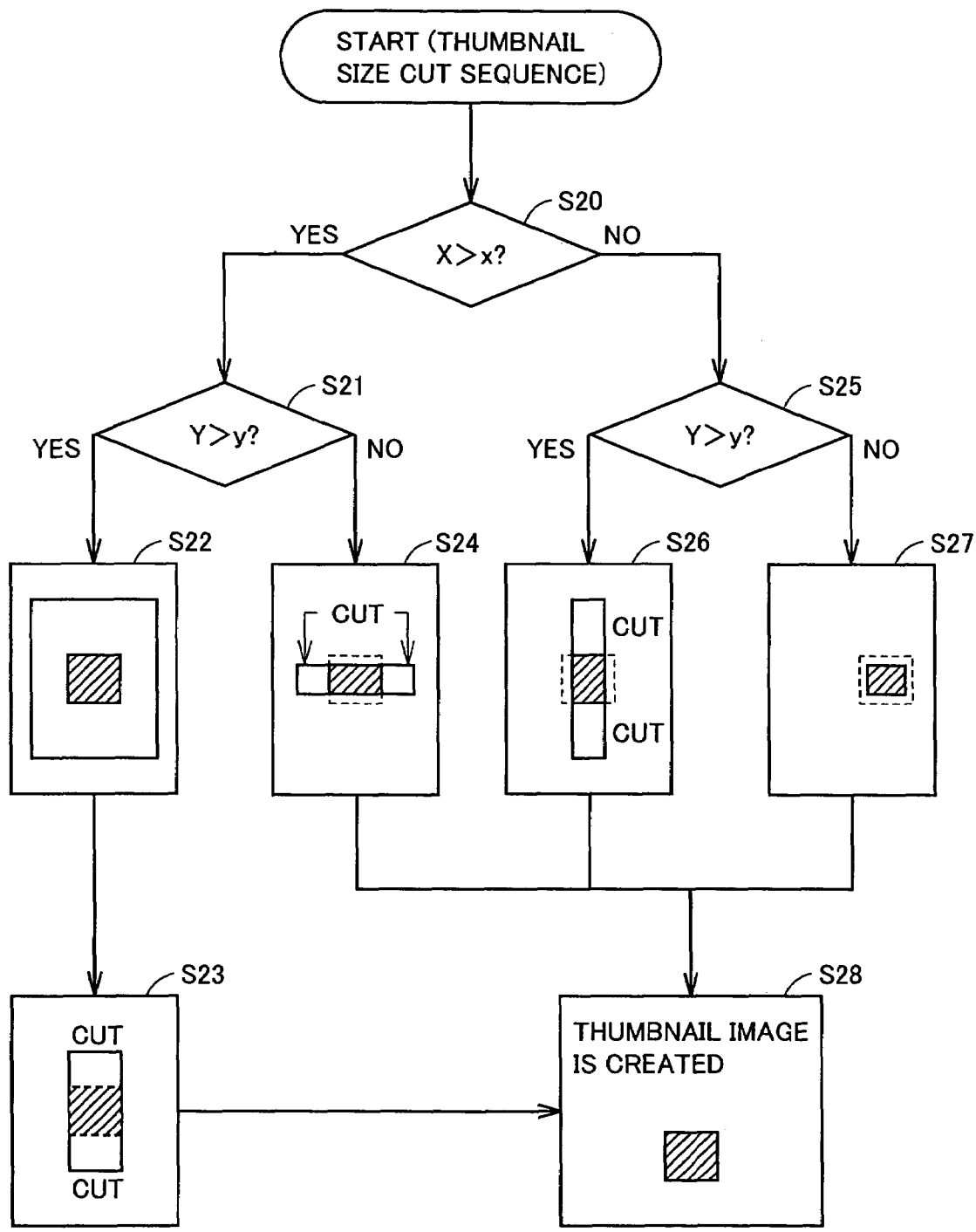
FIG. 8 is a flowchart of a thumbnail size-cut sequence.

The processing at S13 in FIG. 7A will be described with reference to a thumbnail size-cut sequence in FIG. 8. Here, it is assumed that an image of original image data that is a source for creating a thumbnail of the bitmap in work memory 4 has a horizontal size "X" and a vertical size "Y", and a thumbnail has a maximum horizontal size "x" and a maximum vertical size "y".

First, the horizontal size "X" and the vertical size "Y" of the original image data are compared with the maximum horizontal size "x" and the maximum vertical size "y" of the thumbnail, respectively (S20, S21, S25). If "X">"x" and "Y">"y" (YES at S20 and YES at S21), the vertical and horizontal size of the image of the original data exceeds the maximum size of the thumbnail shown by the hatched lines in the figure (S22). The original image data is then reduced without changing the ratio between the horizontal size "X" and the vertical size "Y" of the original image data, so as to match the horizontal size "X" with the maximum horizontal size "x". Furthermore, that portion of data which exceeds the maximum vertical size "y" in the vertical direction is cut (S23). A thumbnail image for a thumbnail is thus created from the original image data (S28).

Alternatively, the reduction may be performed, for example, as follows. The bitmap data constituting the original image data is divided into a plurality of matrix-like bit groups, an average value of each of the divided matrix bit groups is employed as a representative value of the matrix, and the original image data may be reduced to be formed of a plurality of representative values as employed. In this case, since the thumbnail image is created as a collection of the representative values, the thumbnail image is reproduced from the original image with high fidelity.

If "X">"x" and "Y"≦"y" (YES at S20 and NO at S21), that portion of the data with respect to the vertical size "Y" of the original image data which exceeds the maximum horizontal size "x" of the thumbnail is cut (S24), and a thumbnail image is then created (S28).

If "X"≦"x" and "Y"≦"y" (NO at S20 and YES at S25), that portion of the data with respect to the vertical size "Y" of the original image data which exceeds the maximum vertical size "y" of the thumbnail is cut (S26), and a thumbnail image is then created (S28).

If "X"≦"x" and "Y"≦"y" (NO at S20 and NO at S25), the vertical and horizontal size of the original image data is less than that of the thumbnail (S27), the original image data itself serves as a thumbnail image since it need not be reduced or cut (S28). Through the procedure above, the creation of the thumbnail image in FIG. 6 is completed (S10).

In the creation of thumbnail image data from original image data as described above, a thumbnail can be created easily by employing a procedure of cutting data exceeding in size to meet the size of the thumbnail.

Retention portion 5 encodes the original image data and the thumbnail image data created at S10 using compression portion 20, and then sets image number data DX at 1 in order to search for a storable area in retention memory 7 (S30). It is then determined whether reference information D(j) indicated by image number data DX indicates "unused" in work memory 4. If not "unused" (NO at S31), image number data DX is incremented by 1 (S32), and it is determined whether reference information D(j) indicated by the incremented image number data DX indicates "unused", similarly.

With image number data DX incremented, image number data DX of reference information D(j) indicating "unused" is found in work memory 4. In FIG. 9A, since it is determined that reference information D(1) indicates "unused", "1" is determined as image number data DX indicating "unused".

As described above, when work memory 4 is searched and image number data DX corresponding to the "unused" area of retention memory 7 is specified, retention portion 5 writes and stores data group Gi including original data 70 and thumbnail image data 60 as encoded (compressed) as well as management information 50 in the area corresponding to that image number data DX in retention memory 7. The 2D/3D classification data 51, copyright information 52 and next image pointer 53 are written in management information 50 (S33). Here, since the stored original image data 70 and thumbnail image data 60 is the image in 2D image format obtained through the image pick-up at camera portion 3, "2D" is written in 2D/3D classification data 51 and "none" is written in copyright information 52, in the corresponding management information 50.

Next, retention portion 5 writes "JPEG" (Joint Photographic Experts Group) in image classification data 40, "2D" in 2D/3D classification data 41, and "none" in copyright information 42, and then writes a value in next image pointer 43, in reference information D(j) corresponding to the current image number data DX in work memory 4 (S34). Here, the value of the current pointer PN is written in next image pointer 43. Thereafter, pointer PN is updated to indicate the current image number data DX (S35).

Figure 10A:
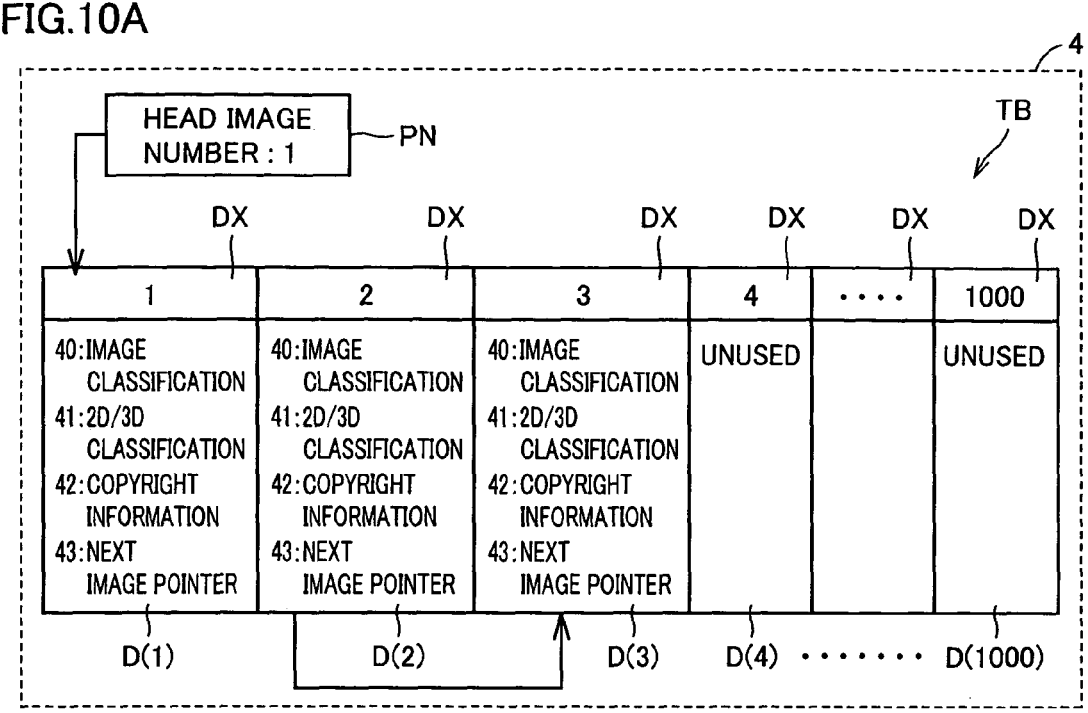
FIGS. 10A and 10B illustrate the data structure in FIGS. 9A and 9B with an image additionally retained.
Figure 10B:
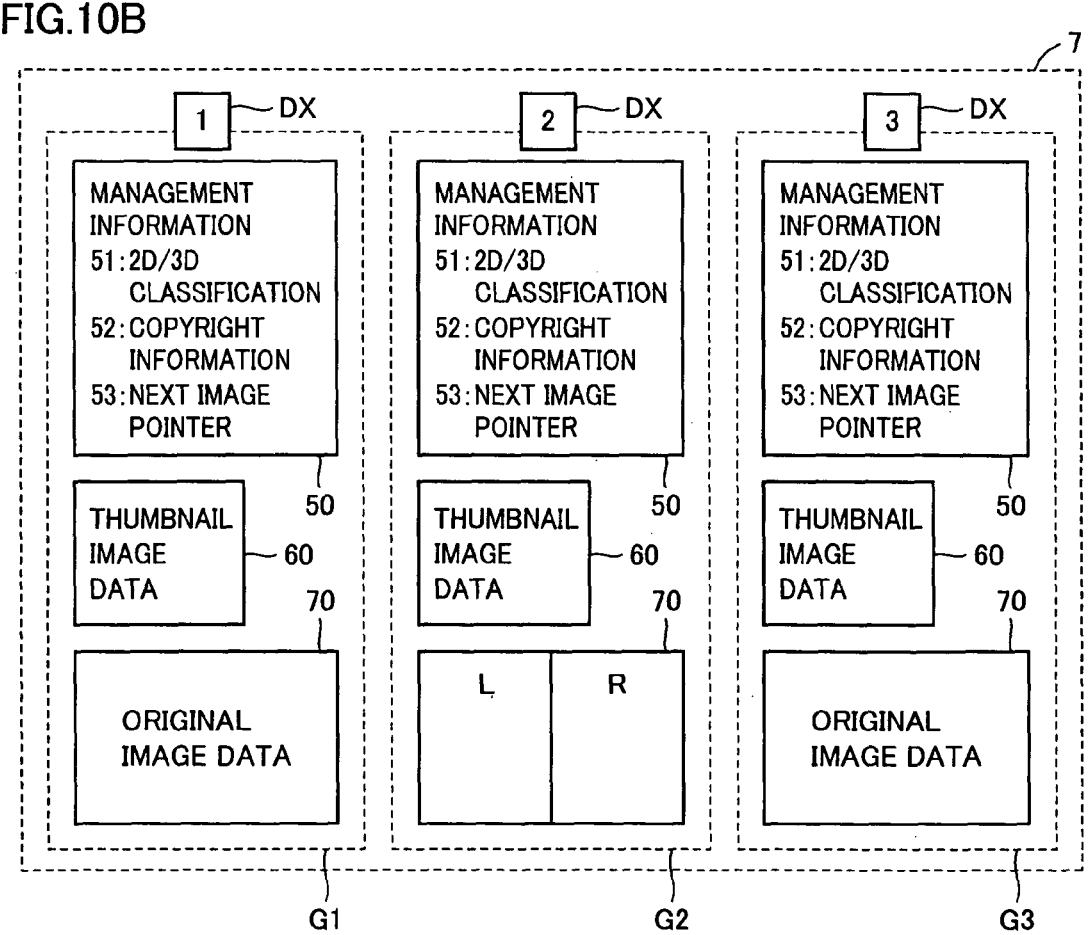

FIGS. 10A and 10B show the state of the memory where new image data, that is, data group G1 is additionally retained after the state in FIGS. 9A and 9B.

A case where image data retained in a thumbnail displayable manner is 3D image data in 3D format will be described. As shown in FIG. 5B, image data in 3D image format is first obtained (S1a). Specifically, control portion 2 reads designated original image data 70 of original image data 70 (original image data 70 in data group G1 or G3) in 2D image format retained through the procedure described above, from retention memory 7 for output to converter portion 21. Converter portion 21 receives and converts it into image data in 3D image format, that is, image data with parallax formed of left-eye image data L and right-eye image data R, for output to work memory 4. The image data in 3D image format is thus obtained.

Thereafter, the retention processing (S5) in FIG. 6 is performed. In the retention processing, the thumbnail image creation processing (S10) is first performed. The detail of the thumbnail creation processing is shown in FIG. 7A.

Figure 7B:
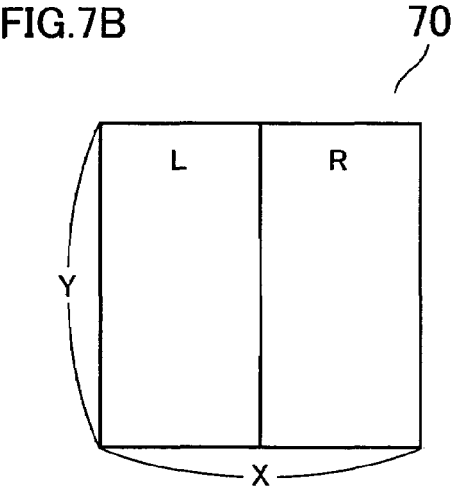

In the thumbnail creation processing in FIG. 7A, it is determined based on the obtained image data that the image data is in 3D image format ("3D" at S11a). Therefore, the obtained image data is arranged for stereoscopic vision such that the corresponding left-eye image data L and right-eye image data R are adjacent to each other on the left and right sides, respectively, in the bitmap in work memory 4 for a 3D image of a prescribed size, as shown in FIG. 7B (S12 in FIG. 7A). FIG. 7B shows original image data 70 that is a source to create a thumbnail image.

Figure 7C:
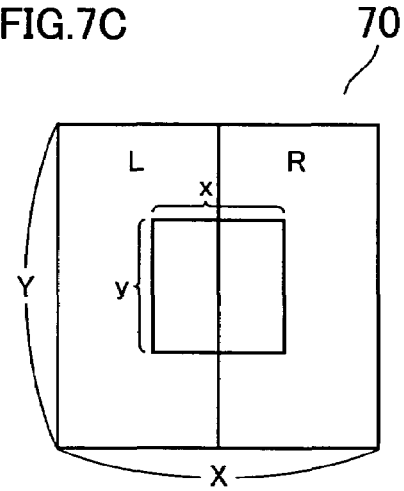

Original image data 70 in FIG. 7B is edited, as shown in FIG. 7C, to have such a size that satisfies the size of the thumbnail to be displayed on display portion 10 (S13). Specifically, if original image data 70 is in 3D image format, as shown in FIGS. 7B and 7C, it is assumed that the image of original image data 70 arranged with left-eye image data L and right-eye image data R adjacent to each other has a vertical size "Y" and a horizontal size "X", and that a thumbnail has a maximum vertical size "y" and a maximum horizontal size "x". Then, in accordance with the procedure in FIG. 8 described above, the reduction is similarly performed by size-cut or using representative values to obtain thumbnail image data 60 as shown in FIG. 7D.

Figure 7D:
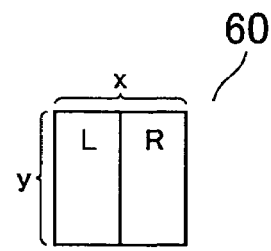

Thereafter, in accordance with the similar procedure as described above, original image data 70 in FIG. 7B and thumbnail image data 60 in FIG. 7D are stored (retained) in association with the other data in data group Gi in the unused area of retention memory 7. Since the retained original image data 70, that is, the image data in FIG. 7B is in 3D image format, the corresponding 2D/3D classification data 41 (51) indicates "3D".

Figure 11:
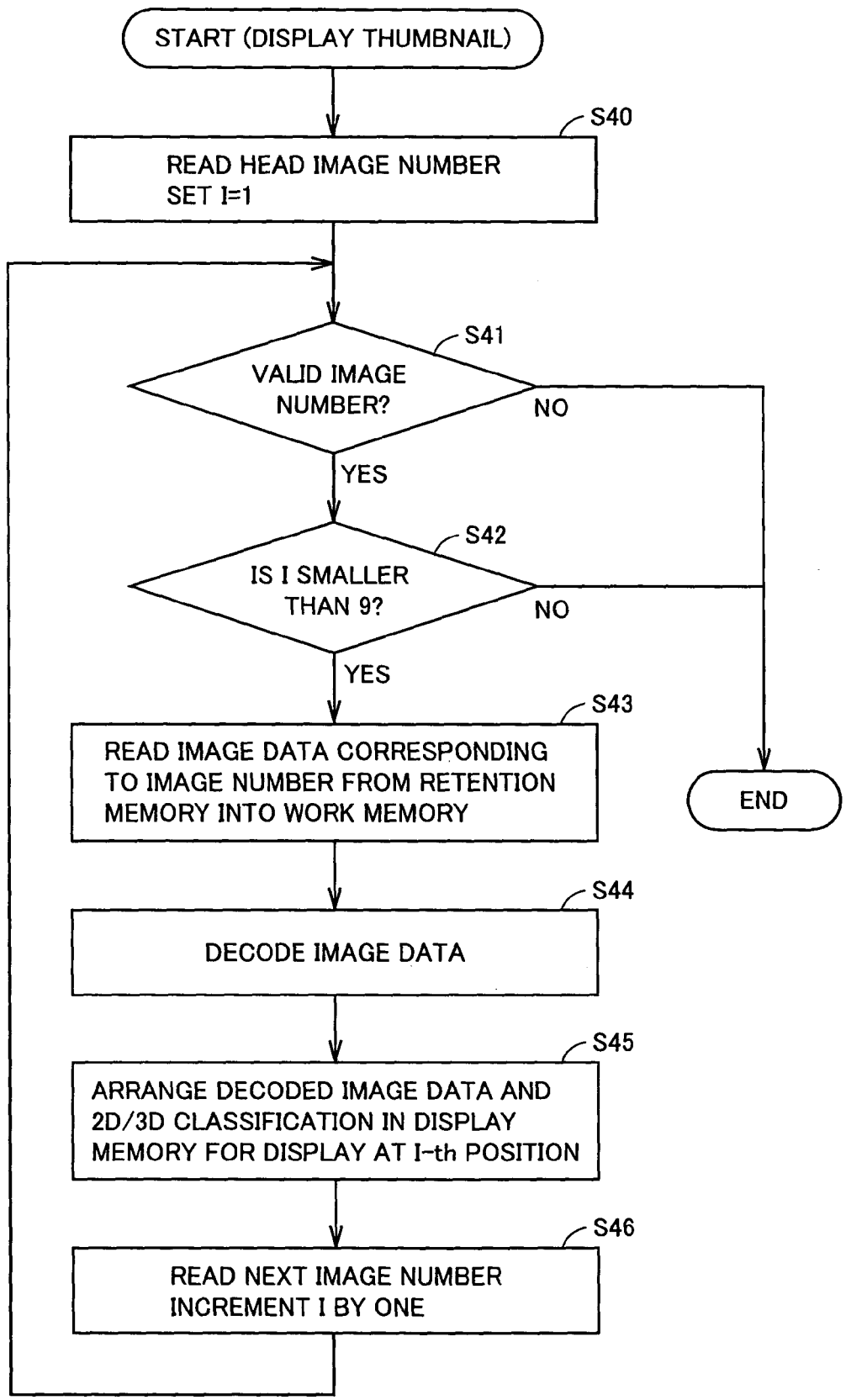
FIG. 11 is a flowchart illustrating a procedure of displaying a list of thumbnails using retained thumbnail image data in accordance with the embodiment.

The procedure of listing thumbnails using thumbnail image data 60 retained as described above will now be described with reference to the flowchart in FIG. 11. Here, it is assumed that display portion 10 is in 2D display mode through the operation of mode button 19 and that the listing of thumbnail images is such that at most nine thumbnail images can be displayed in a screen.

Control portion 2 first reads the value of pointer PN indicating image number data DX at the head and sets a variable "I" for counting thumbnail images to be displayed at 1 (S40) to determine whether the read value of pointer PN indicates the value of the valid image number data DX (S41). If it is determined that the value of pointer PN indicates the invalid image number data, or if the value of variable I is not more than, that is, exceeds the number (=9) of thumbnails that can be displayed (NO at S41 or NO at S42), a series of processing ends:

If not (YES at S41 and YES at S42), control portion 2 searches work memory 4 for head image number data DX indicated by pointer PN, and reads out thumbnail image data 60 of data group Gi in retention memory 7 that corresponds to head image number data DX found as a search result, into work memory 4 (S43).

Expansion portion 6 then decodes (expands) thumbnail image data 60 read out to work memory 4 in accordance with the compression format indicated by the corresponding image classification data 40 (S44), and arranges the data in display memory 8 to be displayed at a thumbnail data position SD(I) in FIG. 4 (S45). At this time, 2D/3D classification data 41 corresponding to the read thumbnail image data 60 is read out. Based on the read data 41, expansion portion 6 also arranges a character image CH (see FIG. 4) indicative of a classification of 2D/3D at thumbnail data position SD(I) of display memory 8 such that the character image is overwritten on a portion of the thumbnail image and displayed concurrently with the thumbnail image.

Accordingly, the thumbnail image based on original image data 70 in 3D image format and character image CH indicative of a classification of 2D/3D appear on display portion 10 in 2D image mode, so that it can be recognized at a glance whether original image data 70 corresponding to the displayed thumbnail is in accordance with 2D image format or 3D image format. Although character image CH is displayed as "2D" or "3D" as shown in FIG. 4, only "2D" may be displayed as character image CH; otherwise the data is recognized as 3D. Alternately, only "3D" may be displayed as character image CH; otherwise the data is recognized as 2D.

Control portion 2 thereafter reads the next image number data DX and increments control variable I by 1 (S46). Returning to S41, the remaining processing is repeated similarly. Finally, the listing of thumbnail images 60 in retention memory 7 is displayed as shown in FIG. 4.

The user can recognize at a glance the image retained in retention memory 7, though reduced, by recognizing the displayed listing of thumbnail images. When a desired thumbnail image is designated through a button operation or the like, original image data 70 corresponding to that thumbnail image data 60 is read from retention memory 70 and displayed on display portion 10.

At this time, if 2D/3D classification data 41 corresponding to the designated thumbnail image indicates "3D", left-eye image data L of original image data 70 corresponding to the thumbnail image is enlarged twice in the horizontal direction (widthwise: X) to be displayed in 2D mode. Here, if the user presses mode button 19, control portion 2 switches display portion 10 to 3D mode to cause the image based on original image data 70 read from retention memory 7 to appear on display portion 10. The user can thus see the displayed image in stereoscopic vision. When 2D/3D classification data 41 corresponding to the designated thumbnail image indicates "2D", the image based on the corresponding original image data 70 appears on display portion 10 in 2D mode.

As described above, a desired image for conversion from 2D image to 3D image through converter portion 21 can be designated among the displayed listing of a plurality of thumbnail images.

Although original image data (3D image data) 70 retained in retention memory 7 for creating a corresponding thumbnail image is obtained and created from the picked-up image data output from camera portion 3, the obtaining procedure is not limited thereto.

For example, 3D image data may be received (downloaded) from an external source by communication through antenna 15, wireless portion 14 and communication control portion 13, or it may be input from an external device such as an image scan device (not shown) connected to mobile phone 1 in FIG. 1. Alternatively, camera portion 3 itself may pick up an image to output data in accordance with 3D image format, rather than 2D image format. In such a case, the processing of creating left-eye image data L and right-eye image data R for 3D image data in FIG. 7A is omitted.

Similarly, although original image data (2D image data) 70 retained in retention memory 7 for creating a corresponding thumbnail image is obtained from picked-up image data output from camera portion 3, the obtaining procedure is not limited thereto. For example, 2D image data may be received (downloaded) from an external source by communication through antenna 15, wireless portion 14 and communication control portion 13. Alternatively, 2D image data may be input from an external device such as an image scan device (not shown) connected to mobile phone 1 in FIG. 1.

It is noted that mobile phone 1 is provided with a function of displaying image data in 3D image format in the form of a thumbnail, the present invention is similarly applicable to another type of mobile phones and a variety of information processing equipment with a display function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display device comprising:
  a display portion;
  three-dimensional shrunken image creating means for creating a shrunken image formed by shrinking a target image, based on data of a three-dimensional image formed of a left-eye image and a right-eye image for stereoscopic vision of said target image;
  two-dimensional shrunken image creating means for creating a shrunken image formed by shrinking said target image, based on data of a two-dimensional image of said target image; and
  shrunken image displaying means for displaying a list comprising said shrunken image created by said three-dimensional shrunken image creating means and said shrunken image created by said two-dimensional shrunken image creating means on a same screen of said display portion, wherein
  said three-dimensional shrunken image creating means has reducing means for reducing data of said left-eye image and said right-eye image of said three-dimensional image data so that said target image satisfies the size of said shrunken image.

2. The image display device according to claim 1 wherein an image is viewed as a two-dimensional image on said display portion.

3. The image display device according to claim 1 wherein said reducing means has size-cut means for cutting that portion of data which exceeds the size of said shrunken image of said target image, from the data of said left-eye image and said right-eye image.

4. The image display device according to claim 1 wherein the data of said left-eye image and said right-eye image is bitmap data, and
where said bitmap data is divided into a plurality of matrix data, said reducing means extracts a representative value in each matrix and forms data of said left-eye image and said right-eye image with a plurality of said extracted representative values.

5. The image display device according to claim 1 further comprising:
data storing means for storing data of a plurality of said created shrunken images in association with respective image data that is a source for creating the shrunken image data; wherein
said shrunken image displaying means displays a listing of a plurality of said shrunken images on said display portion, based on the data of a plurality of said shrunken images stored in said data storing means.

6. The image display device according to claim 1 wherein said three-dimensional image data is one of externally applied data and data created based on said two-dimensional image data for said target image.

7. The image display device according to claim 1 wherein said shrunken image displaying means displays identification information indicative of which of said three-dimensional image data and said two-dimensional image data was used to create the shrunken image.

8. The image display device according to claim 1 wherein said two-dimensional image data is image data obtained by picking up and outputting an image of an object.

9. An image display method comprising:
a three-dimensional shrunken image creating step of creating a shrunken image formed by shrinking a target image, based on data of a three-dimensional image formed of a left-eye image and a right-eye image for stereoscopic vision of said target image;
a two-dimensional shrunken image creating step of creating a shrunken image formed by shrinking said target image, based on data of a two-dimensional image of said target image; and
a shrunken image displaying step of displaying a list comprising said shrunken image created in said three-dimensional shrunken image creating step and said shrunken image created in said two dimensional shrunken image creating step on a same screen, wherein
said three-dimensional shrunken image creating step has a reducing step of reducing data of said left-eye image and said right-eye image of said three-dimensional image data so that said target image satisfies the size of said shrunken image.

10. An image display device comprising:
a display selectively operable in a two-dimensional display mode and in a three-dimensional display mode;
a camera for capturing two-dimensional images;
a first memory for storing the captured two-dimensional images and corresponding thumbnail images;
a converter for selectively converting two-dimensional images stored in the first memory to three-dimensional images each formed from left-eye and right-eye images and storing the three-dimensional images and corresponding thumbnail images in the first memory; and
a controller for accessing the memory and generating a display of thumbnail images on the display portion, the display of thumbnail images comprising a mixed display in which thumbnail images for both two-dimensional images and three-dimensional images are displayed at the same time.

11. The image display device according to claim 10, wherein the thumbnail images for the three-dimensional images comprise portions of both the corresponding left-eye and right-eye images.

12. The image display device according to claim 11, wherein the thumbnail images for the three-dimensional images are provided by arranging the left-eye and right-eye images side-by-side and cutting the side-by-side images to be a specified size.

13. The image display device according to claim 10, wherein the display of thumbnails images permits identification of which thumbnail images are for two-dimensional images and which thumbnail images are for three-dimensional images.

14. The image display device according to claim 10, wherein the first memory comprises a plurality of data groups respectively associated with one of the two- and three-dimensional images stored therein, each data group comprising:
an image number for uniquely identifying the corresponding image;
management information including classification information specifying whether the corresponding image is a two-dimensional image or a three-dimensional image;
original image data; and
thumbnail image data generated from the original image data.

15. The image display device according to claim 14, wherein each data group further comprises next image pointer data associated with a display sequence for displaying the images.

16. The image display device according to claim 14, further comprising:
a second memory storing a management information table for the data groups in the first memory.

17. The image display device according to claim 16, wherein the second memory has a higher access speed than the first memory.

18. The image display device according to claim 10, further comprising:
an input device for selecting one of the thumbnail images from the display of thumbnail images.

19. The image display device according to claim 18, wherein the controller is responsive to the selecting of a thumbnail image for a three-dimensional image for displaying an enlarged two-dimensional version of the one of the left-eye and right-eye images for that three-dimensional image.

20. The image display device according to claim 19, wherein the controller is responsive to an input via the input device for changing the display mode of the display to a three-dimensional display mode and for displaying the three-dimensional image corresponding to the selected thumbnail image.

21. An image display device according to claim 10, wherein the image display device is a mobile phone.

22. An image display device according to claim 10, wherein the image display device is an information processing device.

* * * * *

UNITED STATES PATENT AND TRADEMARK OFFICE
CERTIFICATE OF CORRECTION

PATENT NO. : 7,098,939 B2  Page 1 of 1
APPLICATION NO. : 10/663742
DATED : August 29, 2006
INVENTOR(S) : Hamamura et al.

It is certified that error appears in the above-identified patent and that said Letters Patent is hereby corrected as shown below:

On the Title page, Item (73), delete "Kyoto" and insert --Osaka-- therefor.

Signed and Sealed this

Twenty-ninth Day of May, 2007

JON W. DUDAS
*Director of the United States Patent and Trademark Office*